Figure 3:
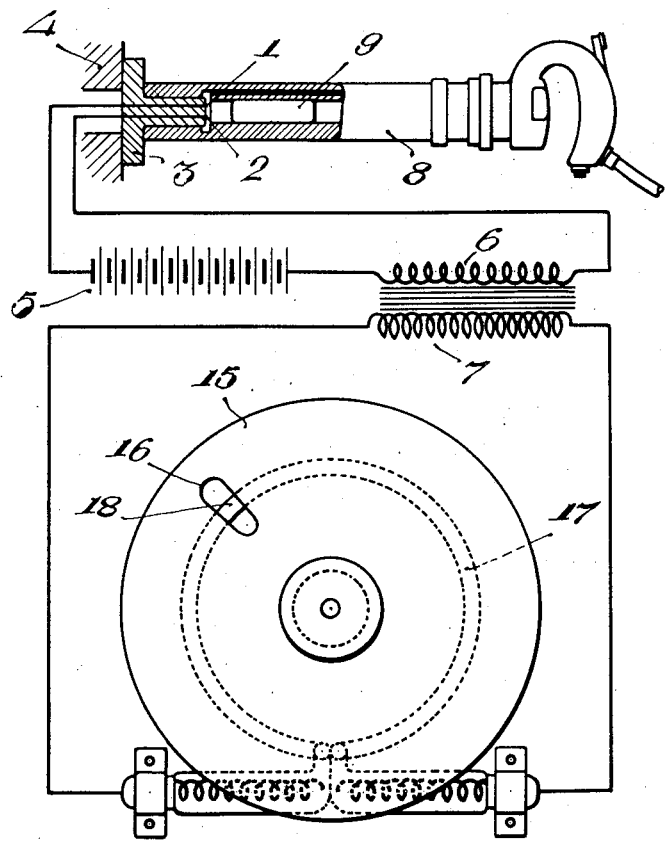

Oct. 22, 1929. T. TAKAHASHI 1,733,078
APPARATUS FOR MEASURING THE PERIOD OF RECIPROCATING BODIES
Filed Oct. 12, 1927 2 Sheets-Sheet 1
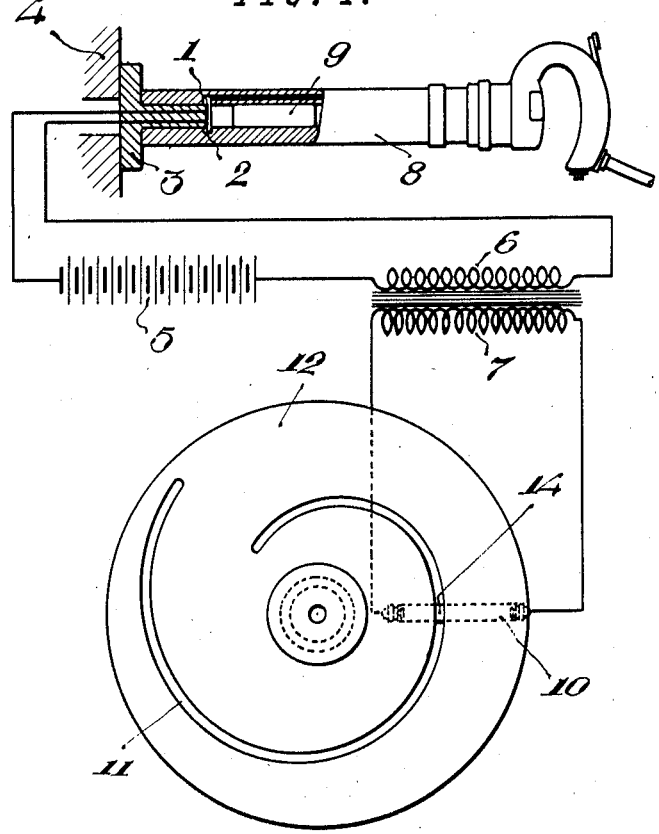
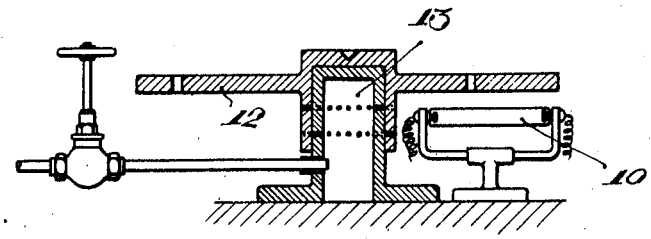

Patented Oct. 22, 1929

1,733,078

UNITED STATES PATENT OFFICE

TATSUMI TAKAHASHI, OF HIGASHI-KU, OSAKA, JAPAN

APPARATUS FOR MEASURING THE PERIOD OF RECIPROCATING BODIES

Application filed October 12, 1927, Serial No. 225,759, and in Japan June 9, 1927.

This invention relates to improvements in apparatus for measuring the period of a reciprocating body and aims to provide an apparatus of a simple construction which enable us to determine with facility the frequency of a moving body reciprocating at a high speed.

According to the invention, a reciprocating body, the period of which is to be determined, is caused to periodically close an electric circuit, thereby lighting a spark discharge tube or an electric lamp fixedly disposed behind a rotating disk whose number of revolutions is known or can easily be measured. The disk is provided with an aperture of any suitable form. By relative disposition of the revolving aperture and the fixed spark discharge tube at the moment when the latter is flashed, and due to the persistence of vision, a number of disconnected lights or luminous images sighted through the aperture will appear as if to be moving to and fro in single file on the rotating disk along the luminous zone of the fixed spark discharge tube while the number of revolutions of the rotating disk is low, and when it reaches to a certain amount these luminous images change into only one image which appears to be travelling repeatedly in one direction, or in the other, or it will stand still, according as the number of revolutions of the rotating disk is lower, higher, or equal to the frequency of the flashes. In this manner the frequency of the flashes or the illuminations, which is equal to the number of reciprocations of the moving body, can be measured by reading the speed of the rotating disk by means of a suitable tachometer, at the moment when only one uninterrupted luminous image stands still on the disk.

In one modification of the invention, the moving body in its reciprocation flashes up periodically a spark discharge tube fixedly disposed behind the rotating disk in such a manner that it extends in a straight line in a radial direction with respect to the disk, the disk being provided wth an aperture of a spiral form. When the spark discharge tube is flashed periodically by the reciprocation of the moving body, besides increasing gradually the angular velocity of the rotary disk, a number of disconnected images of the lights sighted through the aperture will appear, due to the persistence of vision, to move to and fro in single file along the luminous zone of the spark discharge tube on the rotating disk while the number of revolutions of the rotating disk is low, and when it reaches to a certan amount these luminous images change into only one image which appears as if to move either from the centre toward the edge of the disk, or in the opposite direction, or it will appear to stand still, according as the number of revolutions of the disk is greater, or smaller, or equal to the number of reciprocations of the moving body, or vice versa. When only one uninterrupted image stands still at the minimum rotary speed of the disk, the frequency of the moving body is equal to the number of revolutions of the disk.

The invention also comprises a modification in which the tube disposed behind the disk is of a circular form and the image of light is sighted through an aperture of a small dimension formed on the disk. In this case the images will appear to move circumferentially, instead of radially, along the periphery of the tube. The number of revolutions of the disk at the particular moment when only one uninterrupted image rests at a certain fixed position on the disk at the minimum rotary speed of the disk is equal to the number of reciprocations to be determined.

Figure 4:
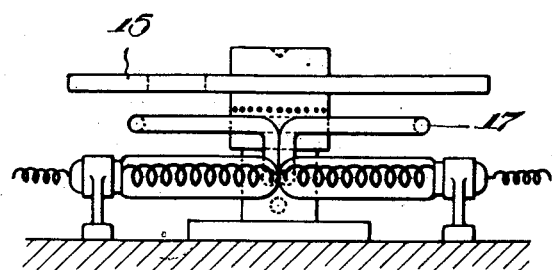

Figure 1 shows a plan illustrating the general arrangement of an apparatus according to my invention, as applied to the measurement of the number of blows per unit time of a pneumatic hammer. Figure 2 is an elevation thereof, partly in section, showing the details of the rotary disk and the fixed spark discharge tube. Figure 3 shows in plan a modification of the apparatus according to my invention. Figure 4 shows an elevation thereof.

Referring now particularly to the characters of reference on the drawings, Figures 1 and 2 show my invention as applied to the measurement of the number of blows per unit time of a pneumatic hammer, which number ranges from about 400 to 5000 per minute. In these figures, 8 is a pneumatic hammer under test, 3 a snap provided at the mouth of the pneumatic hammer, and 1 and 2 are the two terminals of the insulated wires led to the inner end of the snap 3, which rests upon the seat plate 4. The terminals 1 and 2 are connected in series with a direct current source 5 and the primary circuit 6 of an induction coil, the two poles of the secondary circuit 7 of the induction coil being connected to a fixed spark discharge tube 10. By this arrangement the electric circuit comprising the battery and the primary of the induction coil will be closed at the terminals 1 and 2 by the body of the piston 9, as it strikes the end of the snap. 12 is a rotary disk placed in front of the fixed spark discharge tube 10, and is provided with an aperture 11 of a spiral form, the spark discharge tube being fixedly disposed in a radial direction with respect to the disk as shown on the figure. The disk can be rotated at any desired speed, being driven by a well known siren equipment 13 provided beneath the said disk.

When the pneumatic hammer is operated, the terminals 1 and 2 are caused to be electrically connected through the intermediary of the piston 9, making up a closed circuit through the battery 5 and the primary circuit 6 of the induction coil, whenever the piston 9 strikes the end of the snap 3. In this manner, intermittent temporary currents, flowing through the primary circuit 6 of the induction coil at each blow of the hammer 8, produce the secondary induced currents at a high pressure, which currents flow through the spark discharge tube 10 and flash the spark discharge tube momentarily and in exact synchronism with the recurring blows of the pneumatic hammer.

In the meantime, the disk 12 may be set in rotation by the siren device 13. While the speed of the disk is low, a number of disconnected images by the spark discharge tube 10 as sighted through the aperture 11 will appear as if to be moving to and fro in single file along the spark discharge tube on the rotating disk owing to the persistence of vision, and when the speed reaches to a certain amount these images change into only one image 14 travelling repeatedly in a radial direction along the fixed spark discharge tube on the rotating disk, and as the speed approaches nearer to the oscillatory motion of the piston, the travelling speed of the image 14 gradually decreases, and finally when the number of revolutions of the disk 12 equalizes the number of reciprocations of the piston 9, the image of the light 14 will stand still at a certain point upon the disk. In this manner the number of blows per unit time of the pneumatic hammer may be determined by measuring the number of revolutions of the rotating disk by means of a speed measuring device, such as a tachometer.

The motive power to drive the disk is immaterial. If an electric motor is employed the speed of the rotary disk may be varied in a very simple manner by means of a rheostat. In the arrangement illustrated, the speed may be regulated by adjusting the inlet valve shown. The use of a siren device 13 has an advantage in that the speed can be determined by the pitch of the musical sound produced thereby.

In Figurs 3 and 4, which show a modified form of my invention, the rotary disk 15 is provided with a small aperture 16. Behind the disk and in a concentric relation therewith is fixedly disposed an annular spark discharge tube 17. The position on the disk of the hole 16 is such that a part of the fixed annular spark discharge tube 17 can always be sighted regardless of the angular position of the aperture 16. The other parts of the device are same as those shown in Figures 1 and 2.

The device operates in a similar manner as the one above mentioned. When the number of revolutions of the disk 15 is not exactly equal to the number of reciprocations of the hammer and is slightly lower than the latter, only one continuous image of light 18 sighted through the aperture will appear to recede in the opposite direction in which the disk rotates. On the contrary, if the former exceeds the latter, the image 18 will appear to advance in the direction in which the disk rotates. When the number of revolutions per unit time of the rotary disk approaches nearer to the number of reciprocations of the hammer, the travelling motion of the image also gradually decreases and finally it comes to a standstill, when the speed of the disk exactly corresponds to the frequency of recurrence of the hammer. The number of revolutions of the disk then is to be read.

In the examples shown in the illustrations, a spark discharge tube was employed. But means of illumination in my device by no means confines itself to a spark discharge tube. A specially formed neon discharge lamp employed in combination with an induction coil, or any other suitable device of known sort, such as nitrogen or helium filled discharge tubes are also preferable. Also an incandescent filament lamp of a sufficiently small specific heat may be used for this purpose.

My device enables us to determine with facility the accurate number of blows in unit time of a pneumatic hammer, a rock drill, or any similar reciprocating bodies. Such measurement has been performed heretofore with much trouble and difficulty by the use of any precision apparatus such as an oscillograph, the Paynter's rock drill testing machine, or the Olsen pneumatic hammer testing machine, etc.

Though the favorable number of reciprocations per minute which can be measured by my apparatus as above mentioned ranges approximately from 200 to 20000, yet the range may materially be extended by the ingeniousness on the part of the designer.

It goes without saying that my invention by no means confines itself to the realizations mentioned above and illustrated in the accompanying figures. On the contrary the invention comprises all and any modifications falling within the scope of the claims. Also it is evident that the invention is not limited to the testing of a pneumatic hammer only, but it is also applicable to the determination of the period of any rectilinear or curvilinear reciprocating motions taking place in various sorts of mechanism.

Claims:

1. An apparatus for measuring the frequency of reciprocations of a moving body, comprising in combination, a signalling electric circuit associated with the moving body, a rotary stroboscopic disc, means emitting an audible note to set the said disc in rotation, an electric light emitting device having no appreciable lag and disposed behind the said disc, and means to close the said signalling electric circuit including the light emitting device by reciprocation of the said moving body.

2. An apparatus for measuring the frequency of reciprocating bodies, comprising in combination, a signalling electric circuit, a rotary stroboscopic disc having a narrow aperture of a spiral shape, means to set the said disc in rotation, an electric light emitting device having no appreciable lag of a straight line form disposed radially in relation to and behind the said disc, and means to close the said signalling circuit including the light emitting device at each reciprocation of a moving body under test.

3. An apparatus for measuring the frequency of a reciprocating body, comprising in combination, a signalling electric circuit, a rotary stroboscopic disc having a narrow spiral shaped aperture, a siren device to drive the said disc, an electric spark discharge tube of straight line form disposed radially in relation to and behind the said disc, and means to close the said signalling circuit including the said tube, in relation to the frequency of a moving body under test.

In testimony whereof I have affixed my signature.

TATSUMI TAKAHASHI.